(12) United States Patent
Ma

(10) Patent No.: US 8,374,567 B2
(45) Date of Patent: Feb. 12, 2013

(54) HIGH SPEED SERIAL LINK WITH POWER SPECTRAL DENSITY FREQUENCY RESPONSE SUPPRESSION

(75) Inventor: Fan Yung Ma, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 1083 days.

(21) Appl. No.: 12/237,943

(22) Filed: Sep. 25, 2008

(65) Prior Publication Data

US 2010/0075615 A1    Mar. 25, 2010

(51) Int. Cl.
*H04B 1/10* (2006.01)
*H04L 27/00* (2006.01)
*H04M 1/64* (2006.01)

(52) U.S. Cl. ....... 455/296; 455/307; 455/63.1; 375/256; 379/88.07

(58) Field of Classification Search .............. 455/63.1, 455/127.4, 306, 307, 213, 73, 296, 67.13, 455/570, 114.2, 278.1, 283; 375/256, 300; 379/88.07
See application file for complete search history.

(56) References Cited

U.S. PATENT DOCUMENTS

| | | | |
|---|---|---|---|
| 7,212,137 B2 * | 5/2007 | Melanson | 341/77 |
| 7,289,568 B2 | 10/2007 | Harp et al. | |
| 7,696,913 B2 * | 4/2010 | Melanson | 341/143 |
| 2004/0042539 A1 | 3/2004 | Vishakhadatta et al. | |
| 2005/0119025 A1 | 6/2005 | Mohindra et al. | |
| 2007/0073942 A1 | 3/2007 | Gregorius et al. | |

* cited by examiner

*Primary Examiner* — Eugene Yun
(74) *Attorney, Agent, or Firm* — SpryIP, LLC

(57) ABSTRACT

This disclosure relates to noise suppression in data transfers in transceivers of wireless devices.

16 Claims, 7 Drawing Sheets

HIGH SPEED SERIAL LINK WITH POWER SPECTRAL DENSITY FREQUENCY RESPONSE SUPPRESSION

BACKGROUND

In the advent of modern technologies, wireless communication devices such as personal digital assistants (PDA), cellular phones, radios, and the like, have found a need for higher data rates between a Radio Frequency (RF) component and a baseband component of a transceiver.

The transceiver may be a component of wireless communication devices such as PDAs, cellular phones, PDA, radios, and the like. The transceiver may include the baseband component and that RF component, providing transmission and receiving of data. The baseband component may be used to modulate a carrier frequency of the RF component with a baseband signal. During demodulation, the baseband component re-creates the baseband signal. The RF component may generate the carrier frequency for transmission of baseband signal. During demodulation, the RF component may filter the modulated RF signals and amplifies the filtered modulated RF signal which allows the baseband component to re-create the baseband signal.

The baseband component and the RF component may be connected through a serial link or a parallel link. The serial link uses one bit at a time in a communication channel, while a parallel link may use several bits. The baseband component and RF component may also be connected with one another through an analog interface or a digital interface. The analog interface may allow analog signals to be transmitted or received between the baseband component and the RF component, using an analog electronic circuit. The digital interface may allow digital signals to be transmitted or received, between the baseband component and the RF component, using digital circuits.

A digital interface in certain applications, such as higher speed serial link data transfers, may replace an analog interface. The data rates transfer in analog interfacing may be susceptible to noise due to analog offsets, periodic spectrum, harmonic distortion, and the like. The digital interface also may have problems such as limited data rates that may be caused by Radio Frequency Interference (RFI). This is particularly evident in relatively higher speed serial data rates transfer, where the harmonic signal frequencies of the data rate of the main signal approaches the RF bands. Another problem of a digital interface may be that the careful suppression of RFI may not be sufficient due to a sensitive Low Noise Amplifier (LNA) at a receiving end of the communication channel. The LNA may be any type of amplifier that may amplify weak modulated RF signals captured by an antenna.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed towards techniques and methods of filtering possible sources of Radio Frequency Interference (RFI) in high speed serial link data rates transfer between a baseband section and the RF section. RFI filtering may be implemented through Power Spectral Density (PSD) suppression of the data rate harmonic signal (causing RFI) with the use of a filter. The filter may be a Finite Impulse Response (FIR) filter that may produce a different shape or spectrum (zero insertion) at the output for a given data rate harmonic signal that may cause RFI.

Figure 1:
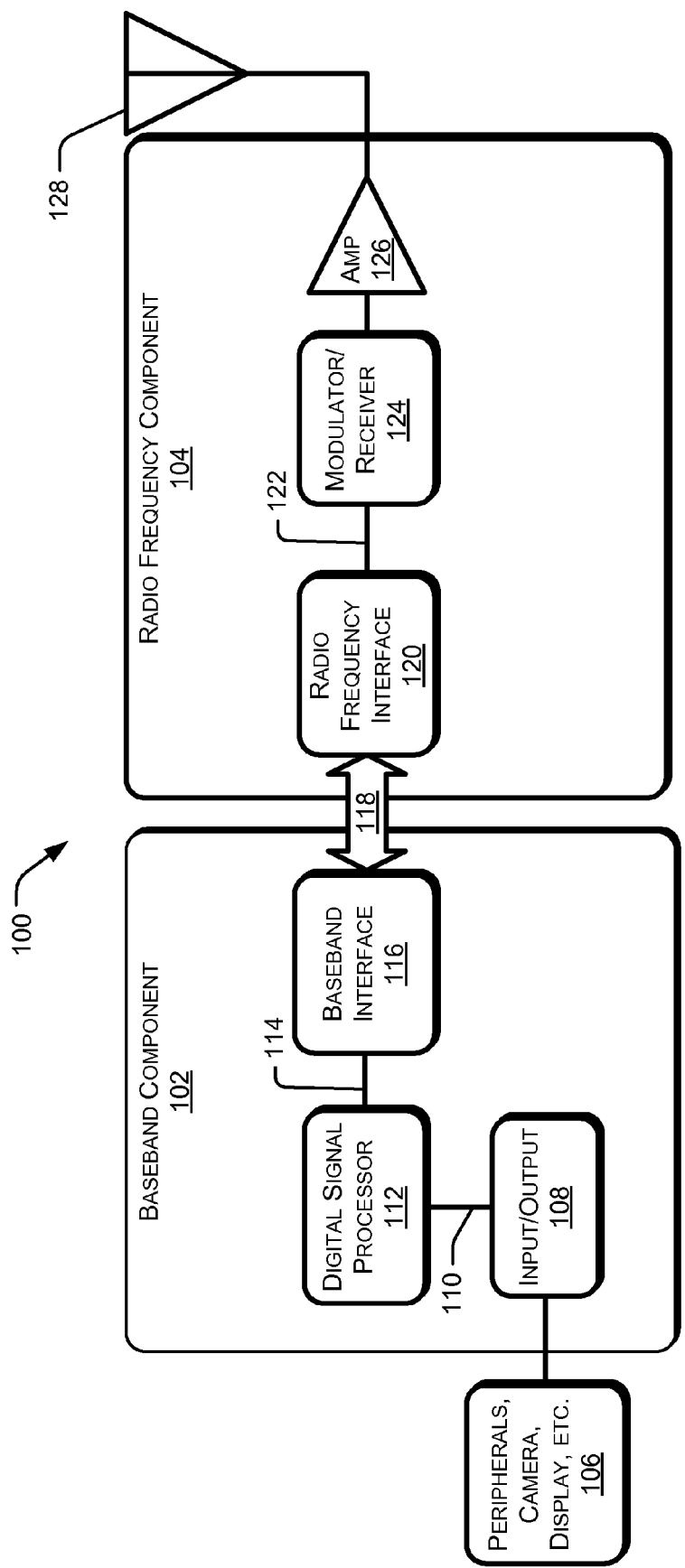
FIG. 1 is a block diagram illustrating a combined radio frequency (RF) component and baseband component with a high speed serial link.

FIG. 1 illustrates a transceiver 100 that includes a baseband component 102 and a RF component 104 using a high speed serial link. The transceiver 100 may be used in wireless communications devices such as cellular phones, radios, PDA, etc. The transceiver 100 may be integrated as a single component that includes a baseband section (i.e., baseband component 102) and an RF section (i.e., RF component 104). In certain implementations, the baseband section and the RF section may be separate and different components that respectively include the baseband component 102 and the RF component 104.

In an implementation, a baseband component 102 processes received or transmitted data (i.e., a data signal). During transmission, baseband component 102 may encode the data signal, identify the data signal's prior state before modulation, and may transmit the data signal for modulation, where output from the baseband component is referred to as a baseband signal. During demodulation, baseband component 102 may identify the prior state of the data signal following demodulation. The baseband component 102 decodes the demodulated data signal to re-create the data signal. The prior state of the data signal may include attributes of the data signal, such as amplitude of the inphase (I) signal and quadrature phase (Q) signal, frequency, or phase amount. During modulation, RF component 104 may combine the baseband signal with the carrier frequency to produce the modulated RF signal, amplify the modulated RF signal, and further filter the modulated RF signal before transmission. During receiving, the RF component 104 may receive the modulated RF signal, filter the modulated RF signal, amplify the modulated RF signal; and demodulate the modulated RF signal.

Peripherals, display and camera, etc. 106 may be sources of data to be transmitted. The data may include voice signals, pictures, videos, electronic mails, and the like. The data can be an analog signal, a digital signal, or a combination of analog signal and digital signal. The analog signal may be a time continuous signal where some time varying feature of the signal is a representation of some other time varying quantity. The digital signal may refer both to discrete-time signals that have a discrete number of levels, or to continuous-time waveform signals in a digital system which may represent a bit stream.

An Input/Output (IO) 108 may convert analog signals into digital signals using analog to digital conversion. The IO 108 may process the data signals to be transmitted from the peripherals, display, camera, etc. The IO 108 may also process the data signals that include control signals in the peripherals, display, camera, etc. during receiving. The IO 108 may group the data signals into codewords. The codewords may contain number of bits encoding each phase, frequency or amplitude in a particular phase of the digital signal. The IO 108, after grouping the digital signals into codewords, may map the codewords into attributes providing multi-bit parallel data link entering the digital signal processor. The attributes may take the form of amplitudes of I and Q, frequency or phase of the signal depending upon the modulation techniques that may be used by the transceiver unit. The modulation techniques may be Amplitude Shift Keying (ASK), Phase Shift Keying (PSK), Frequency Shift Keying (FSK), or Quadrature Amplitude Modulation (QAM) as is well known in the art.

The baseband signal may pass a signal 110 and processed by a digital signal processor or DSP 112. The DSP 112 may receive and process the data signals to limit the bandwidth forming a PSD or spectrum of the equivalent low pass signal or baseband signal. The PSD or spectrum of the data signal may contain the main baseband signal and a set of spectral replications. The set of spectral replications may be considered as image frequencies of the main baseband signal and may be filtered in the DSP 112. In an implementation, signal 114 may be a filtered baseband signal to a baseband interface 116, using a multi-bit parallel data link. For example, the multi-bit parallel data link may be 16 bit parallel data link for relatively higher data rates transmission in transceiver 100.

Transmission of a baseband signal from the baseband component 102 to RF component 104, and receiving of demodulated RF signal from RF component 104 to baseband component 102, may be performed through an interface. The interface may be analog or digital, although in relatively higher speed serial data rates transfers, a digital interface may be used to transmit and/or receive relatively the higher serial data rates. In an implementation, a digital interface may include the baseband interface 116, signal interface 118 and the RF interface 120 working together as a serial link for high speed serial data rates transfer. Baseband interface 116 may receive the multi-bit parallel baseband signal from DSP 112, and transmit the baseband signal through a signal interface 118 for higher speed serial link transmission of data rates.

The baseband interface 116 may include a converter that converts the multi-bit (e.g., 16-bit) parallel link data into a serial one-bit link data. During receiving, the baseband interface 116 may also convert incoming serial digital streams into multi-bit (e.g., 16 bit) parallel link data. In relatively higher speed serial link data rates transfer, the data rates may radiate harmonic signals at frequencies that may coincide with the transmit and receive signals of the transceiver and RFI may appear in the serial link transmission. The baseband interface 116 may filter the harmonic signal frequencies to attain high speed bi-directional communications between baseband component 102 and RF component 104.

In an implementation, the baseband interface 116 may use a mix digital/analog FIR filter (digital bit streams input and analog output) to suppress the PSD of the harmonic signal frequencies that are closer to or equal to the RF carrier frequencies. The FIR filter may contain an impulse response that is "finite", since the FIR filter settles to zero in a finite number of sample intervals. The impulse response of the FIR filter may be the response of the FIR filter for a given brief impulse at the input. The impulse response of the FIR filter may further identify a transfer function of the FIR filter through the z-transform of the impulse response. The transfer function of the FIR filter may characterize the FIR filter whether the FIR filter may be a zeroing/attenuating FIR filter, boosting FIR filter, or amplifying FIR filter. The zeroing/attenuating FIR may have an amplitude response that contains zero or close to zero value for a given frequency of the input signal. The zeroing/attenuating FIR filter may be used to suppress the PSD of the harmonic signals at frequencies that are closer to or equal to RF frequencies. The boosting FIR filter may contain almost flat amplitude response for a given frequency of the input signal. The amplifying FIR filter may contain an amplitude response that increases with the frequency of the input signal.

A signal interface 118 may allow concurrent serial bi-directional communication between the baseband interface 116 and the RF interface 120. In an implementation, the signal interface 118 may contain a six wire interface. The six wire interface may include independent transmit (Tx) signal pairs, receive (Rx) differential signal pairs, system clock (SysClk) line, and a system clock enable (SysClkEn) line. The Tx and Rx differential signal pairs may allow transmission and receiving of data signals between the baseband interface 116 and the RF interface 120. The SysClk line may be generated by the RF interface 120, while the SysClkEn line may come from the baseband going to the RF interface 120. Both SysClk and SysClkEn line may provide the timing references for digital serial data transmission and recovery.

A radio frequency interface 120 may contain a converter and a FIR filter similar to the baseband interface 116. The radio frequency interface 120 may receive the data from the serial link transmission and converts the one-bit digital data bit stream into multi bit (e.g., 16 bit) parallel link data. During receiving, the RF interface 120 may also convert multi-bit (e.g., 16 bit) parallel link data into a one-bit digital data streams before transmission into the baseband component 102. Signal 122 may then carry the multi-bit (16 bit) parallel link data signal into the Modulator/Receiver 124.

Modulator/Receiver 124 in the RF component 104 may generate a high-frequency sine wave carrier waveform to carry out modulation. The modulation may be the process of combining the filtered baseband signal with the carrier frequency resulting in that the filtered baseband signal is frequency shifted into a modulated RF signal. Amplifier 126 may amplify the modulated RF signal and the modulated RF signal may now be transmitted through antenna 128.

The limited data rates transfer in relatively higher speed serial link transfer may be because of RFI generated by the transceiver 100. RFI may include electromagnetic interference that may produce spurious emissions and responses in the transceiver unit. RFI may occur in cases where the harmonic signals are radiated at frequencies closer to or equal to the RF carrier frequency level during transmission.

At relatively higher data rate transfers in the serial link transmission, higher frequency components or harmonic signal frequencies may also be produced. When the frequency of harmonic signals are closer to or equal to amount of the RF carrier frequency, RFI may appear and may limit the efficiency of a relatively higher speed serial link transmission. The filter as described above, and further discussed below, may be used to suppress the PSD of the harmonic signal frequencies that may cause RFI near the RF band.

Figure 2:
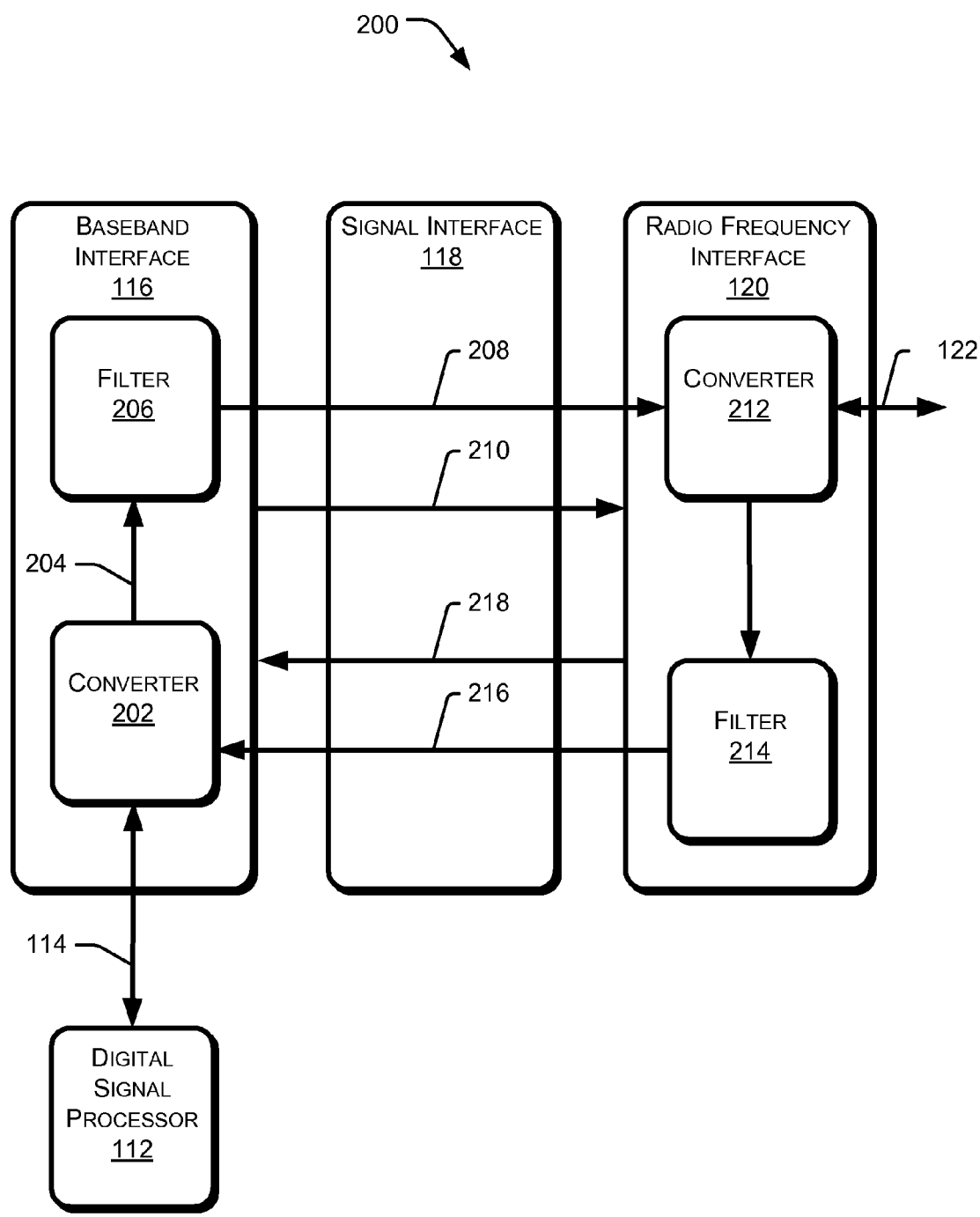
FIG. 2 is a block diagram illustrating a serial link data rates transfer with a digital filter.

FIG. 2 illustrates digital interface 200 for high speed serial link transmission. The digital interface 200 may include converter 202, a signal 204, a filter 206, transmit (Tx) signal differential pair 208, system clock enable (SysClkEn) 210 converter 212, filter 214, receive (Rx) differential pair 216, and system clock (SysClk) line 218. In certain cases, the baseband signal or data rate frequencies together with the harmonic signal frequencies may not produce RFI, because the baseband signal or data rate frequencies may contain a relatively smaller amount of harmonic signal frequencies that may not come closer to or equal to the RF carrier frequency.

Figure 3:
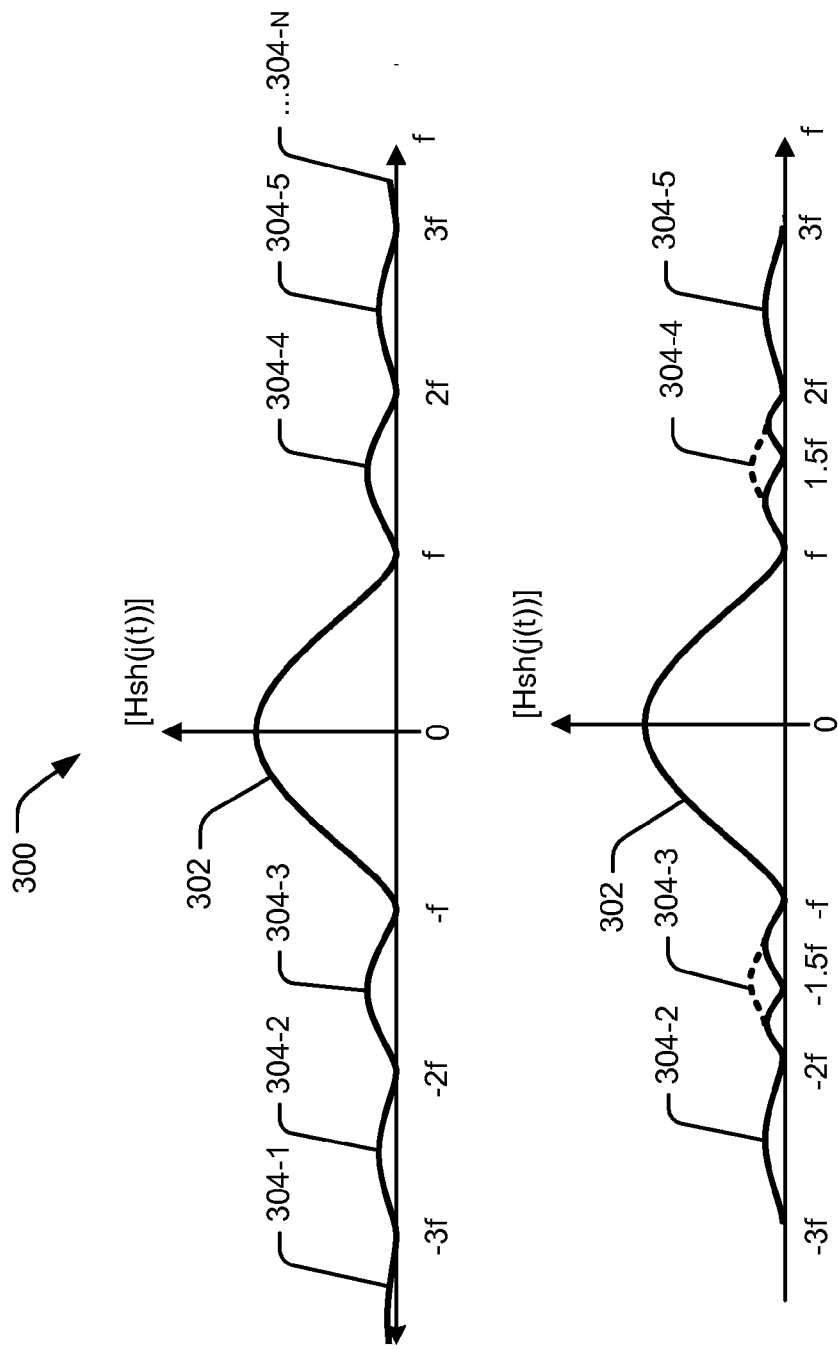
FIG. 3 is a graph illustrating a sinc function frequency response of a Finite Impulse Response filter.

The baseband signals from the digital signal processor 112 may be transmitted through signal 114. For higher data rates transfer, multi-bit (e.g., 16 bit) parallel data link may be used to carry the data signals in signal 114 entering into converter 202. Converter 202 converts the multi-bit (e.g., 16 bit) parallel link data into a one-bit digital data signal that will undergo digital to analog conversion in the FIR filter. If the sequence of bits from the multi-bit (e.g., 16 bit) parallel link data contains a random signal, then the PSD of the one bit signal may contain a white PSD (i.e., flat or constant in all frequencies). Under the assumption that the one bit signal has a flat PSD, the PSD of the transmitted bit stream signal in the serial link may have the same PSD as the sinc function frequency response as shown in FIG. 3. The sinc function frequency response may represent the impulse response of the FIR filter with respect to the serial data rates input. With higher bit rates, the corresponding sinc PSD may have higher frequency components or harmonic signal frequencies that may cause RFI as they approach the RF carrier frequencies.

Filter 206 may be any type of filter that may be used to suppress the PSD of the harmonic signal frequencies. In an implementation, filter 206 may be a mix digital/analog FIR filter which suppresses the PSD of the harmonic signal frequencies, since the FIR filter may be formed with only the equivalent of zeros in the linear domain. The FIR filter (i.e., filter 206) may be formed with only the equivalent of zeros in the linear domain because the FIR filter may be able to depress or push down the amplitude of the FIR filter transfer function for a given input signal. The FIR filter may change the amplitude of the FIR filter transfer function, for a given input signal, in order to produce a different shape at the output of the FIR filter. The different shape in the output of the FIR filter may include suppression of PSD of the harmonic signal frequencies that may cause RFI. The different shape in the output of the FIR filter may also boost or amplify the main baseband signal, while zeroing/attenuating the PSD of harmonic signal frequencies.

A PSD of the harmonic signal frequencies may be suppressed by a FIR filter with the use of a tap or delay and a coefficient value. The delay may be the number of taps or delays (as further discussed below) in a FIR filter which suppresses the amplitude of the FIR filter transfer function. The amount of suppression of the amplitude of the transfer function may depend upon the value of a FIR filter coefficients. The FIR filter coefficients may be designed to attenuate or zero out the PSD of the harmonic signal frequencies that may approach the RF carrier frequencies.

In an implementation, a sample frequency of harmonic signal frequencies passes through the delay or tap lines of the FIR filter. The impulse response of the sample frequency (harmonic signal frequencies) may become zero at the end of the last delay or tap, due to a change in amplitude and phase of the sample frequency. The change in amplitude and phase may be determined by a frequency response of the FIR filter at the given sample frequency of harmonic signal frequencies. The frequency response of the FIR filter at the given sample frequency of harmonic signal frequencies may fully suppress the PSD of the harmonic signals.

The baseband signal from the FIR filter 206 may be transmitted through transmit differential pair 208. A system clock enable 210 may be generated by the baseband interface 116 to provide timing references for digital serial transmission of the baseband signal. The converter 212 may convert the serial bits into a multi-bit (e.g., 16 bit) parallel link data for modulation in Modulator/Receiver 124.

During receiving, the converter 212 may convert the multi-bit (e.g., 16 bit) parallel link data signals transmitted by signal 122 into one bit data signal. The one bit data signal may be filtered by FIR 214 before entering the receive differential pair 216. System clock 218 may be generated by the RF interface 120 to provide timing references for digital data recovery.

FIG. 3 illustrates graph 300 of the sinc function frequency response of the FIR filter (i.e., filter 206) which may include a main signal sine wave 302 and a harmonic signal frequencies sine wave 304. The graph 300 may be plotted as a function of signal frequency component (f) and amplitude as represented by [Hsh(j(t))] for the signal frequency component, where the signal frequency component may defined as the data rate of the main signal and the harmonics of the data rate of the main signal. The main signal sine wave 302 may contain the baseband signal PSD frequency response. The baseband signal sine wave 302 may contain all the information signals that may be needed for higher speed serial link data transfer. The harmonic signal frequencies sine wave 304-1, 304-2, . . . 304-N may be considered as the unwanted signals for the transmission of information data. In a relatively higher data rates transfer, the amount of harmonic signal frequencies sine wave 304 may also increase. When the amount of harmonic signal frequencies increases, the inherent sinc function attenuation may not be sufficient to suppress PSD frequency response for the harmonic signal frequencies. For example, for a serial link operating at time 4 Gbps, the sinc attenuation at 802.11g carrier 2.4 Ghz is about −6 dB.

At the frequency domain, the actual PSD of the transmitted bit stream may contain the product of the one-bit signal PSD and the sinc PSD with zeros at multiples of data rate frequency as shown in FIG. 3. The actual PSD of the transmitted bit stream may contain the sine wave 302 and the harmonic signals sine wave 304. In an implementation, a harmonic signal may be radiated at data rate frequency 1.5 f (sine wave 304-4), which may approach the RF band causing RFI in the transceiver, the FIR filter may insert a zero or attenuate the PSD of the harmonic signal as shown in FIG. 3.

Figure 4:
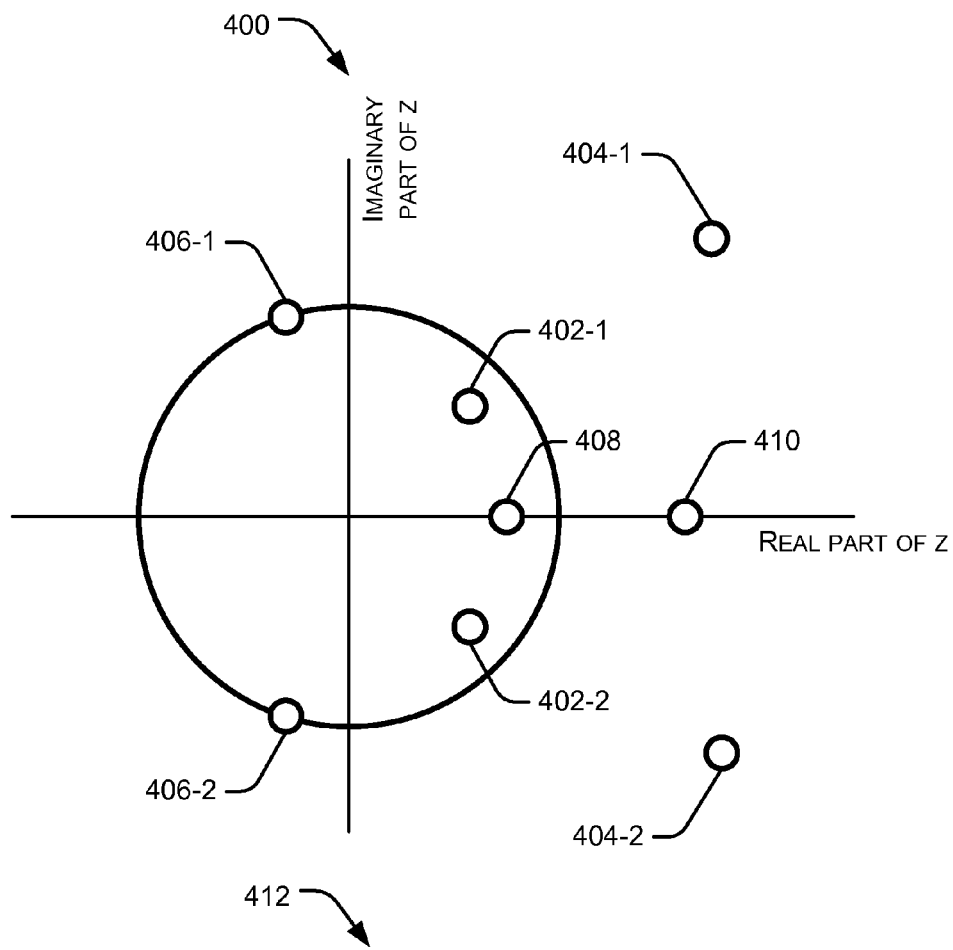
FIG. 4 is a graph illustrating a z-domain plot showing different zero locations related to a Finite Impulse Response filter.

FIG. 4 is an exemplary graph 400 illustrating the z domain plot showing different zero locations. The graph is plotted in the x-axis as a real part of z-transform and the y-axis as the imaginary part of z-transform.

From DSP theory, symmetry in the zeroes of a linear-phase FIR filter and for real impulse response h(n) may be possible where the zeroes of transfer function H(z) occurs in complex conjugate pairs. The linear-phase FIR filter may refer to the function of the FIR filter in delaying the input signal without incurring phase distortion. In an implementation, 402-1 and 402-2 may represent a first zero (z1) location for the transfer function H(z). The first zero (z1) may occur in conjugate pairs where 402-1 may appear in the first quadrant of the circle and 402-2 may appear in the fourth quadrant of the circle. The zeros in 404-1 (1/z1) and 404-2 (1/z1) may be another conjugate pair for the transfer function H(z) of a linear phase FIR filter and so with the zeros in conjugate pair 406, conjugate pair 408 and conjugate pair 410. The zero locations in 402, 404 . . . 410 may be based on the use of Euler's Formula $z=\cos\alpha + i\sin\alpha$ where "i" is the imaginary number and "$\alpha$" may be the angle in radians of the input signal.

When the FIR filter zeroes out or attenuates the input signal, different zero locations may also be produced by the transfer function of the FIR filter. In an implementation, the transfer function of a FIR filter for a given input signal may place the zeros on the unit circle to produce zeros in frequency. Placing the zeros off the unit circle may result in frequency minima (but not zeros).

Different placements of the zeros and the corresponding FIR coefficients 414 are summarized in table 412. The coefficients 414-1, 414-2, 414-3 and 414-4 may have different coefficient values for a transfer function of the FIR filter. For example, to place a zero at half the data rate frequency (Fs/2), the transfer function coefficients may have the values: a (414-1)=1; b (414-2)=0; c (414-3)=0; d (414-4)=0. To place a zero at Fs/4 and 3Fs/4, the transfer function coefficients may have the values: a (414-1)=0; b (414-2)=1; c (414-3)=0; d (414-4)=0.

Figure 5:
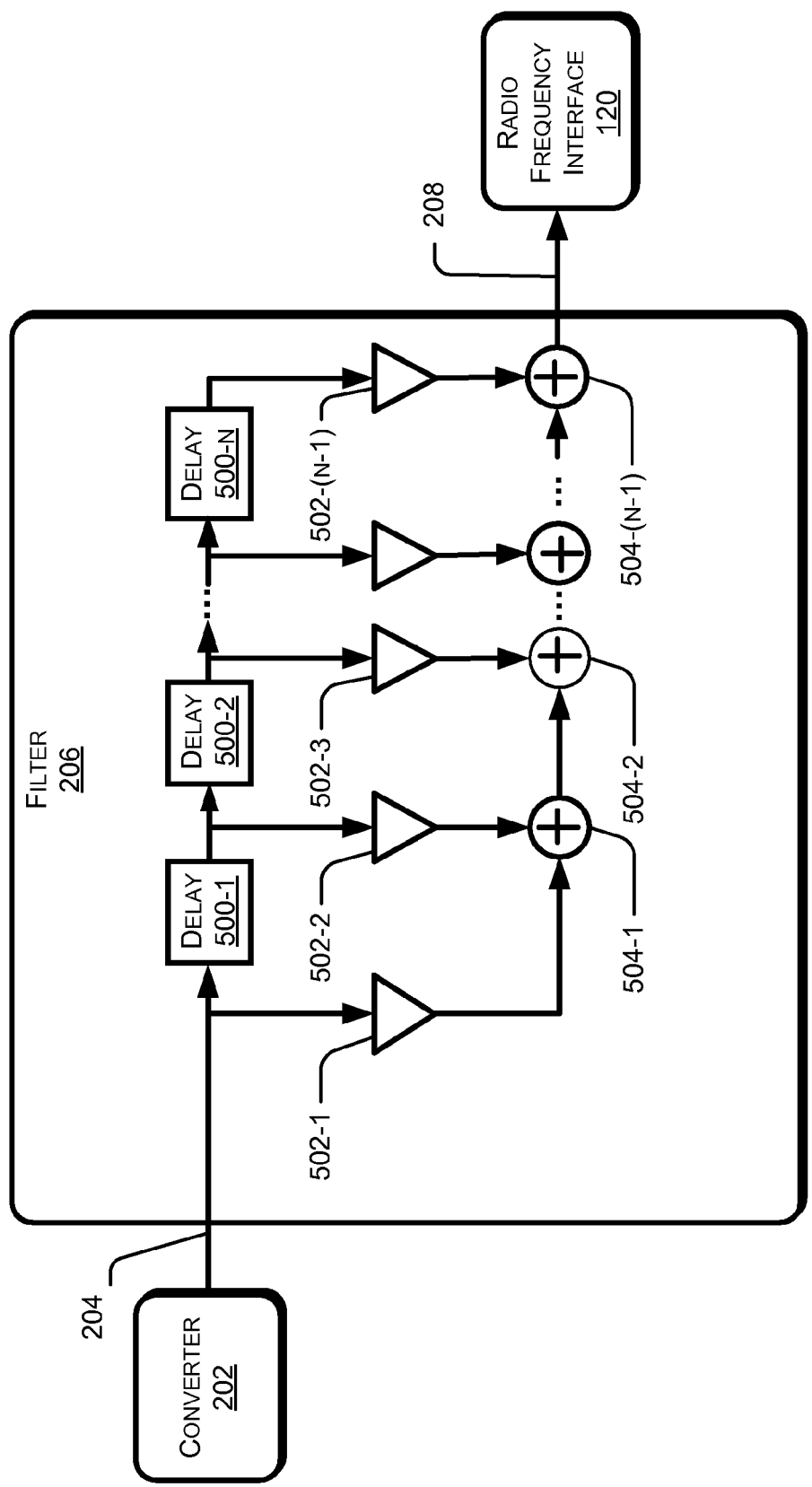
FIG. 5 is a diagram illustrating a Digital to Analog Finite Impulse Response (FIR) insertion of zeros or minima into transmitted signal Power Spectral Density to address radio frequency interference.

FIG. 5 illustrates a Digital to Analog FIR insertion of zeros or minima into a transmitted signal PSD. A FIR filter may be implemented using a finite number of "N" delay taps on a delay line and "N−1" coefficients to compute the algorithm (filter) function. A repetitive delay-and-add format using adders may also be implemented by the FIR filter. In this example, filter 206 and filter 214 are implemented as FIR filters.

In an implementation, transmitted serial data bits x(n) are plugged into signal 204 of filter 206. Delay 500-1 may suppress the amplitude of the transfer function of filter 206 to an amount determined by the coefficient 502-1. The amount of amplitude suppression after the input signal passed through delay 500-1 may be added to the next delay 500-2. The adding of the previous delay 500-1 to the next delay 500-2 may be made through adder 504-1. The amplitude suppression of the filter 206 transfer function for a given input signal may go up to the last delay 500-N. The procedure for PSD suppression in filter 206 may also apply in filter 214 during receiving.

The transmitted serial data bits x(n) after passing through delays 500-1, 500-2, . . . 500-N, may have the same input frequency at the output of the FIR filter but may have a change in amplitude or phase. The change in amplitude or phase may be determined by the frequency response of the filter 206 or filter 214 at the given input frequency of transmitted/received serial data bits x(n).

The number of taps or delays (i.e., Delay 500-1, 500-2, . . . 500-N) and values of the programmable coefficients (502-1, 502-2, . . . 502-N) are selected to "weight" the data being shifted down the delay line to create the desired amplitude response of the filter. The desired amplitude response of the filter 206/filter 214 may determine the shape at output of the filter 206/filter 214. The shape at the output of the filter 206/filter 214 may contain a PSD suppression of the harmonic signal frequencies that may cause RFI near or equal to the RF carrier frequency.

Figure 6:
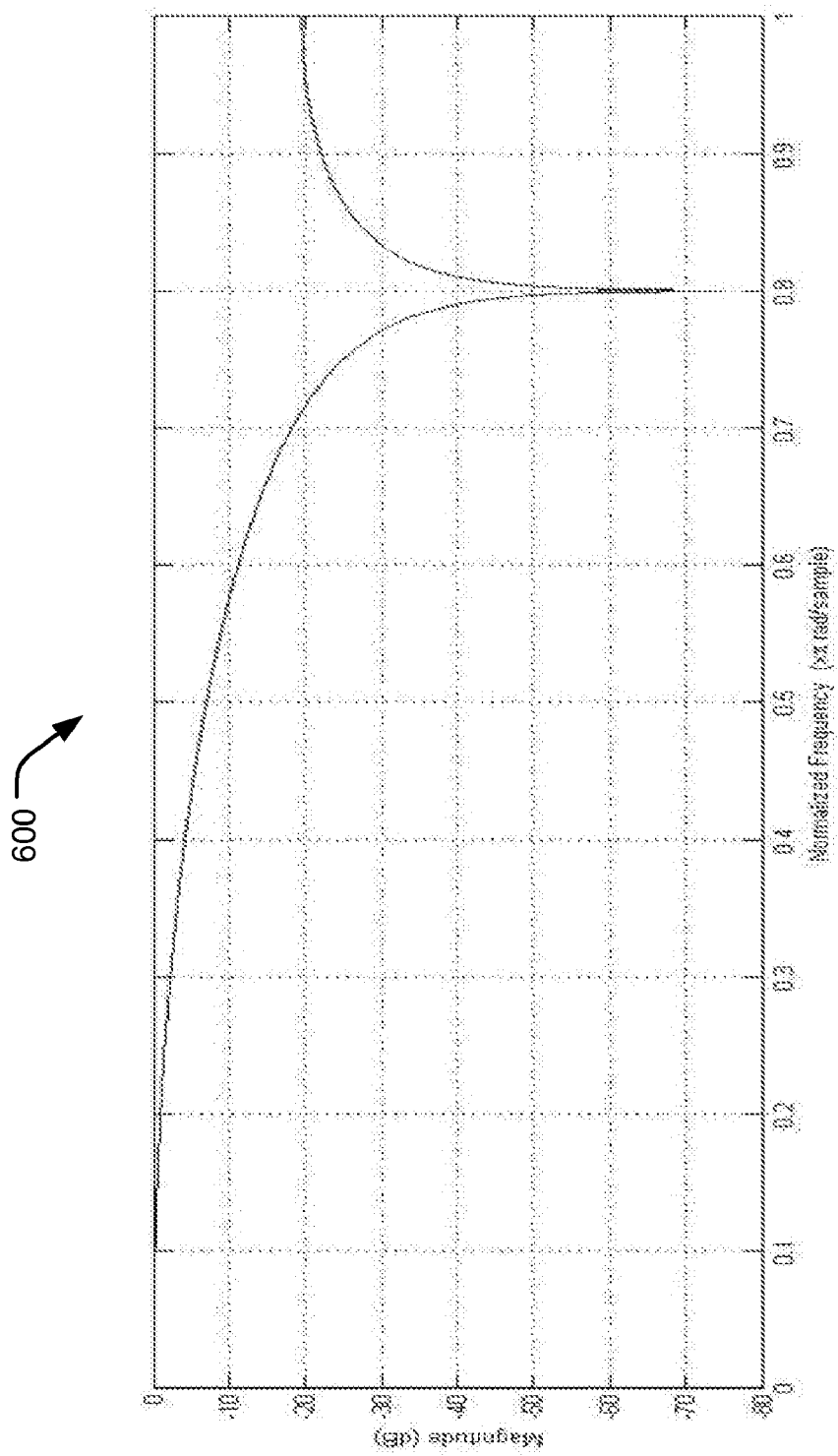
FIG. 6 is a graph of a frequency response magnitude plot for a Finite Impulse Response filter.

FIG. 6 illustrates an exemplary Graph 600 showing the frequency response magnitude plot for a certain coefficient values of a FIR filter. The coefficient values for the FIR filter may modify the output PSD of the input signal. The modification may depend whether the FIR filter acts as a zeroing/attenuating FIR filter, boosting FIR filter, or amplifying FIR filter. As an example, the FIR filter function having coefficients a=1.618, b=1, and c=d=0 may produce a zero PSD frequency response at 0.8*fs/2 and 1.2*fs/2, where "fs" is "data rates frequency". Therefore, the suppression of PSD frequency response at 8*fs/2 and 1.2*fs/2 may form a different shape at the output frequency response of the FIR filter. The different shape in the output frequency response of the FIR filter may be used to minimize the effect of RFI near RF carrier frequency.

Figure 7:
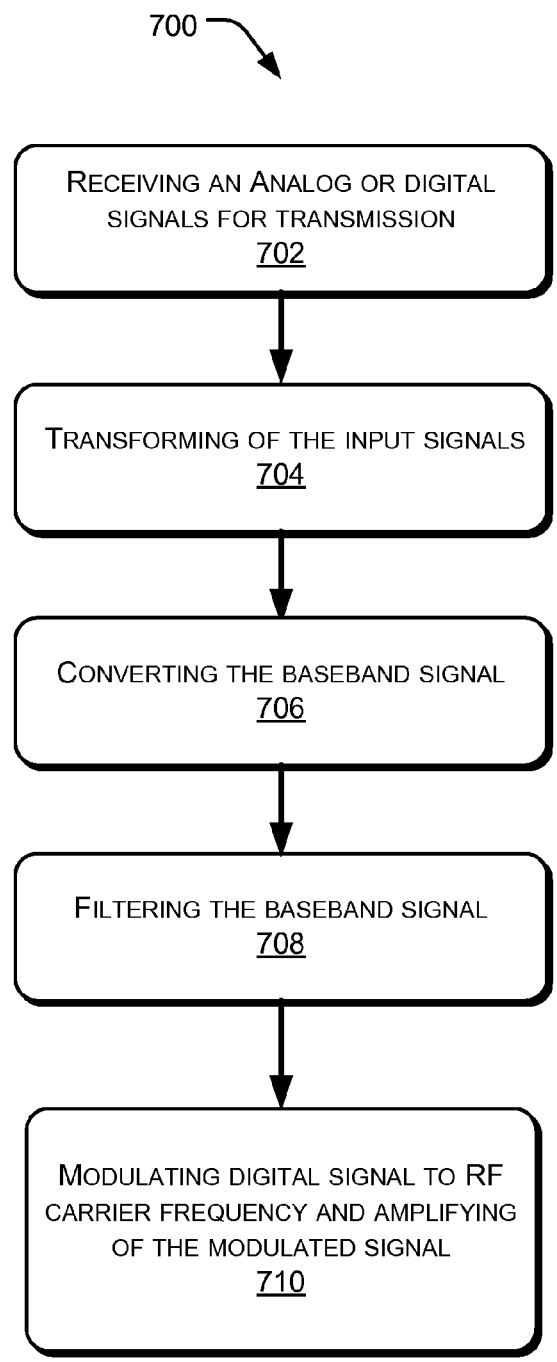
FIG. 7 is a flow chart of radio frequency interference suppression in a high speed serial link.

FIG. 7 illustrates an exemplary method 700 for Radio Frequency Interference (RFI) suppression. In one implementation, the exemplary method 700 can be implemented in the transceiver 100. The exemplary method 700 is described with reference to FIGS. 1-6. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 702, receiving of analog signals or digital signals is performed. An Input/Output interface (e.g., I/O 108) may receive analog signals or data signals coming from the peripherals, display, camera, etc. that may be transmitted to the receiving end in a communication channel. The analog signals may be converted into digital data signals through the use of ADC while the digital input signals may not have to be converted.

At block 704, transforming of the digital data signals is performed. The transforming may be implemented by the Input/Output interface (e.g., I/O 108). The Input/Output (e.g., I/O 108) may group the digital data signals into codewords. The codewords may contain number of bits encoding each phase, frequency or amplitude in a particular phase of digital data signals. The Input/Output interface (e.g., I/O 108), after grouping the digital data signal into codewords, may map the group into an attributes providing a multi-bit parallel data link entering the digital signal processor. The attributes may take the form of amplitudes of I and Q, frequency, or phase of the digital data signal depending upon the modulation technique that may be used by the transceiver unit. The modulation techniques may be Amplitude Shift Keying (ASK), Frequency Shift Keying (FSK), Phase Shift Keying (PSK), or Quadrature Amplitude Modulation (QAM).

In relatively higher data rates transfer, the signal interface (e.g., signal 114) is a multi-bit (e.g., 16 bit) parallel data link carrying the digital data signals from the digital signal processor (e.g., DSP 112) into a converter.

At block 706, converting the multi-bit (e.g., 16 bit) parallel data link into a one bit data signal. The converter (e.g., Converter 202), which may perform parallel to serial conversion during transmission, and serial to parallel conversion during receiving, converts the multi-bit (e.g., 16 bit) parallel data link into one bit data signal for serial link transmission.

At block 708, filtering the one-bit data signal containing harmonic signal frequencies may be performed. The filtering may be performed through the use of a FIR filter. The FIR filter (e.g., Filter 206) may have a transfer function designed to suppress the PSD of harmonic signal frequencies. The transfer function of the FIR filter may be implemented using coefficients of the FIR filter and the number of delay taps in the system.

FIR filter (e.g., Filter 206) coefficients and delay taps may be designed to modify the amplitude of a given input signal at the output of the FIR filter. The modified amplitude at the output of the FIR filter may now have a different shape depending upon the transfer function of the FIR filter whether it will attenuate/zero out, boost, or amplify the input signals. In case of an attenuating/zeroing FIR filter, the different shape at the output of the FIR filter may contain the suppressed PSD of the harmonic signal frequencies that may cause RFI near the RF carrier frequency.

At block 710, modulating by the baseband signal of the RF carrier frequency may be performed. The baseband signal may be combined with the RF carrier frequency in Modulator/Receiver component to produce a modulated RF signal. The modulated RF signal may be amplified further prior to the transmission.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the different filters an schemes may be configured to reduce or suppress RFI and other noise.

What is claimed is:

1. A baseband component of a transceiver comprising:
   an input/output (IO) interface that receives data signals;
   a digital signal processor (DSP) that receives the data signals from the IO interface, limits the bandwidth of the data signal forming an equivalent low pass signal or baseband signal that is further transmitted using multi-bit parallel data link; and
   a baseband interface that converts data associated with the multi-bit parallel data link to serial data, or serial data to multi-bit parallel data link data, that comprises a filter that filters unwanted noise from the data signals, and produces a filtered baseband signal.

2. The baseband component of claim 1, wherein the IO interface receives analog signals, and converts the analog signals to digital signals.

3. The baseband component of claim 1, wherein the filter is a mix digital analog filter that contains serial digital bit streams input and analog output.

4. The baseband component of claim 1, wherein the filter is a Finite Impulse Response (FIR) filter.

5. The baseband component of claim 1, wherein the FIR filter is one of the following: a zeroing/attenuating FIR filter, a boosting FIR filter, or an amplifying FIR filter.

6. The baseband component of claim 1, wherein the FIR filter includes a finite number of impulse responses corresponding to a finite number of sample intervals.

7. The baseband component of claim 1, wherein the FIR filter includes delays to create a desired amplitude response of the filtered signal.

8. The baseband component of claim 1, wherein the baseband interface is a digital interface connected to the RF component by two way serial link.

9. A digital interface component comprising:
   a baseband interface that converts multi-bit parallel data link data into serial data when transmitting data signals, and converts serial data to multi-bit parallel data link data when receiving data signals;
   a signal interface that links the baseband interface and the radio frequency interface for concurrent serial bi-directional communication; and
   a radio frequency (RF) interface that receives data signals from the signal interface.

10. The digital interface of claim 9, wherein the baseband interface and the RF interface include Finite Impulse Response (FIR) filters that inserts zero or attenuate Power Spectral Density causing Radio Frequency Interface.

11. The digital interface of claim 9, wherein the signal interface comprises a six wire interface.

12. The digital interface of claim 9, further comprising a system clock line and a clock enable line to provide timing references for digital serial data transmission and recovery.

13. A method of transmitting data signals comprising:
   receiving the data signals;
   transforming the data signals into codewords and mapping the data signals into attributes wherein the data signals is carried in a multi-bit parallel data link entering the digital signal processor;
   converting the data signals associated with the multi-bit parallel data link into a one bit serial data signal; and
   filtering the serial data signal of unwanted noise into a filtered data signal.

14. The method of claim 13, wherein the receiving includes converting analog signals into digital signals.

15. The method of claim 13, wherein the filtering includes reshaping the data signals to remove the unwanted noise.

16. The method of claim 13, further comprising modulating the filtered data signals with a carrier frequency to produce modulated RF signal.

* * * * *